United States Patent
Harada et al.

(10) Patent No.: US 11,630,656 B2
(45) Date of Patent: Apr. 18, 2023

(54) COMMUNICATION DEVICE AND INFORMATION PROCESSING METHOD

(71) Applicant: NIPPON TELEGRAPH AND TELEPHONE CORPORATION, Tokyo (JP)

(72) Inventors: Takumi Harada, Tokyo (JP); Manabu Yoshino, Tokyo (JP); Junichi Kani, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/045,987

(22) PCT Filed: Apr. 8, 2019

(86) PCT No.: PCT/JP2019/015308
§ 371 (c)(1),
(2) Date: Oct. 7, 2020

(87) PCT Pub. No.: WO2019/208186
PCT Pub. Date: Oct. 31, 2019

(65) Prior Publication Data
US 2021/0117178 A1    Apr. 22, 2021

(30) Foreign Application Priority Data
Apr. 27, 2018   (JP) .............................. JP2018-087760

(51) Int. Cl.
*G06F 9/445*    (2018.01)
*G06F 8/65*    (2018.01)
*G06F 12/02*    (2006.01)

(52) U.S. Cl.
CPC .............. *G06F 8/65* (2013.01); *G06F 12/023* (2013.01); *G06F 12/0292* (2013.01)

(58) Field of Classification Search
CPC ....... G06F 8/65; G06F 12/023; G06F 12/0292
(Continued)

(56) References Cited

U.S. PATENT DOCUMENTS

2013/0246706 A1* 9/2013 Matsumura ............... G06F 8/65
                                                           711/E12.019
2013/0290946 A1    10/2013 Iwadate
(Continued)

FOREIGN PATENT DOCUMENTS

CA       2645404 A1    6/2009
EP       3572932 A1   11/2019
(Continued)

OTHER PUBLICATIONS

Kotani Akira et al., A Software Update Method for Embedded Linux Systems(1), IPSJ 66th National Convention Proceedings, 2004, pp. 1-21-1-22.
(Continued)

*Primary Examiner* — Chuck O Kendall
(74) *Attorney, Agent, or Firm* — Harness, Dickey & Pierce, P.L.C.

(57) ABSTRACT

A communication apparatus includes: a memory that stores, first data on firmware before update, second data on firmware after the update, and a table in which the first data or the second data is associated with an address where the first data or the second data is positioned; and a processor that executes processing based on the first data or the second data positioned at the address defined in the table.

8 Claims, 8 Drawing Sheets

(58) Field of Classification Search
USPC .................................................. 717/168–178
See application file for complete search history.

(56) References Cited

U.S. PATENT DOCUMENTS

2017/0255459 A1    9/2017  Tanimoto et al.
2019/0377569 A1*  12/2019  Harada ................... H04L 67/34

FOREIGN PATENT DOCUMENTS

| JP | H0644078 A | 2/1994 |
| JP | 2009146404 A | 7/2009 |
| JP | 2013232100 A | 11/2013 |
| WO | WO-2018159691 A1 | 9/2018 |

OTHER PUBLICATIONS

Harada, Takumi et al., "Dynamic software updating of OLTs without service interrruption", 2017 25th International Conference on Software, Telecommunications and Computer Networks (Softcom), University of Split, FESB, Sep. 21, 2017, pp. 1-5, XP033261081.

* cited by examiner

COMMUNICATION DEVICE AND INFORMATION PROCESSING METHOD

CROSS-REFERENCE TO RELATED APPLICATIONS

This application is a 371 National Stage of International Application No. PCT/JP2019/015308 filed on Apr. 8, 2019, which claims priority to Japanese Patent Application No. 2018-087760, filed Apr. 27, 2018. The entire disclosures of the above applications are incorporated herein by reference.

TECHNICAL FIELD

The present invention relates to a communication device and an information processing method.

BACKGROUND ART

A communication apparatus (device) generally includes a processor, a nonvolatile memory, a volatile memory, and the like. The nonvolatile memory stores in advance firmware, which is a program for implementing communication functions and the like in the communication apparatus. Upon activation of the communication apparatus, the firmware stored in the nonvolatile memory is deployed on the volatile memory. Then, by executing the firmware deployed on the volatile memory, the communication functions and the like are implemented in the communication apparatus. This provides desired communication service.

To add a new function or fix a bug in the communication apparatus that provides a communication service, it is necessary to update the firmware which is executed. To update the firmware, it is common to temporarily stop the firmware which has been deployed on the volatile memory and is being executed. Thereafter, the firmware stored in the nonvolatile memory is rewritten, and the communication apparatus is reactivated. Accordingly, the updated firmware which is stored in the nonvolatile memory is deployed on the reset volatile memory and executed due to the reactivation (e.g., Non Patent Literature 1).

CITATION LIST

Non Patent Literature

Non Patent Literature 1: Ryo Kotani, Ryozo Kiyohara, Atsushi Settsu, and Taizo Kittaka, "Software Updating Method in Embedded Linux", the 66th National Convention of Information Processing Society of Japan, 2004, p. 1-21-p. 1-22

SUMMARY OF THE INVENTION

Technical Problem

Because the communication functions cannot be utilized during the reactivation of the communication apparatus, the provision of the communication service is temporarily interrupted. Thus, the firmware update greatly affects a user of the communication service. However, if the firmware deployed on the volatile memory is rewritten directly without stopping the firmware being executed, the firmware may be rewritten incompletely. Firmware incompletely rewritten may possibly generate segmentation errors or memory errors or generate fatal failures for hardware in operation. Therefore, it has been known that it is difficult to update the firmware without interrupting the provision of the communication service.

For example, an optical line terminal (OLT), which is a communication apparatus at a station used in an optical access network, also has the above-described problem. It has been known that it is difficult to update firmware without interrupting a communication service in the OLT. As described above, firmware stored in a nonvolatile memory of the OLT is also deployed on a volatile memory and executed upon activation of the OLT. To update the firmware, by rewriting the firmware in the nonvolatile memory, the updated firmware is deployed on the volatile memory from the next activation.

For known techniques to make firmware update less affect an apparatus that requires reactivation after the firmware update, techniques to reduce update time of the firmware have been studied. For example, by storing in advance the firmware after the update in a nonvolatile memory, two types of firmware, the firmware before the update and the firmware after the update, are being held in the nonvolatile memory. Then, this technique allows activation with one of the two types of firmware selected upon activation of the apparatus. Although this known technique reduces the time required to write the firmware into the nonvolatile memory, reactivation of the apparatus is still required to deploy the firmware after the update on a volatile memory.

Moreover, for a method of preventing interruption of service during firmware update, a method of making an apparatus redundant is conceivable. For example, an optical switch or the like is used to change a physical communication path so that processing is switched to an apparatus different from a target apparatus in which the firmware is to be updated. Then, this method returns to the original communication path after the firmware update has been completed. In this case, it is expected that the firmware is more safely updated than in the above-mentioned method of directly rewriting the firmware deployed on the volatile memory. However, this method of making an apparatus redundant additionally requires an optical switch for switching the communication path and a spare OLT and leads to an increase in costs, which is a concern from an economical viewpoint.

In light of the above circumstances, an object of the present invention is to provide a technique capable of updating a program without interrupting a service while suppressing costs.

Means for Solving the Problem

An aspect of the present invention is a communication apparatus including: a memory that stores first data on firmware before update, second data on firmware after the update, and a table in which the first data or the second data is associated with an address where the first data or the second data is positioned; and a processor that executes processing based on the first data or the second data positioned at the address defined in the table.

Moreover, an aspect of the present invention is the communication apparatus described above further including a writing unit that rewrites the address associated with the first data in the table to the address where the second data is positioned.

Furthermore, an aspect of the present invention is the communication apparatus described above, in which the writing unit rewrites the address in accordance with update timing defined in the firmware before the update.

Further, an aspect of the present invention is the communication apparatus described above, in which the writing unit writes the second data into a free region of the memory.

Moreover, an aspect of the present invention is a communication apparatus including: a memory that stores first data on firmware before update; second data on firmware after the update, a table including first information, in which the first data is associated with an address where the first data is positioned, and second information, in which the second data is associated with an address where the second data is positioned, and a table value which identifies the first information and the second information; and a processor that executes processing based on the first data or the second data positioned at the address defined in the first information or the second information identified by the table value stored in the memory.

Furthermore, an aspect of the present invention is the communication apparatus described above further including a writing unit that rewrites the address associated with the first data in the table to the address where the second data is positioned, in which the writing unit rewrites the address in accordance with update timing defined in the firmware before the update.

Further, an aspect of the present invention is an information processing method by a computer of a communication apparatus, and the information processing method includes: storing first data on firmware before update, second data on firmware after the update, and a table in which the first data or the second data is associated with an address where the first data or the second data is positioned; and executing processing based on the first data or the second data positioned at the address defined in the table.

Moreover, an aspect of the present invention is an information processing method by a computer of a communication apparatus, and the information processing method includes: storing first data on firmware before update, second data on firmware after the update, a table including first information, in which the first data is associated with an address where the first data is positioned, and second information, in which the second data is associated with an address where the second data is positioned, and a table value which identifies the first information and the second information; and executing processing based on the first data or the second data positioned at the address defined in the first information or the second information identified by the table value.

Effects of the Invention

According to the present invention, a program can be updated without interrupting a service while costs are suppressed.

DESCRIPTION OF EMBODIMENTS

Modes for carrying out the present invention will be described with reference to the drawings. The embodiments described hereinafter are merely examples, and embodiments to which the present invention is applied are not limited to the following embodiments.

Note that the same reference signs are used for those having the same functions in all the drawings used to describe the embodiments, and the descriptions will not be repeated.

First Embodiment

Hereinafter, a first embodiment according to the present invention will be described.

Configuration of Optical Communication System

Figure 1:
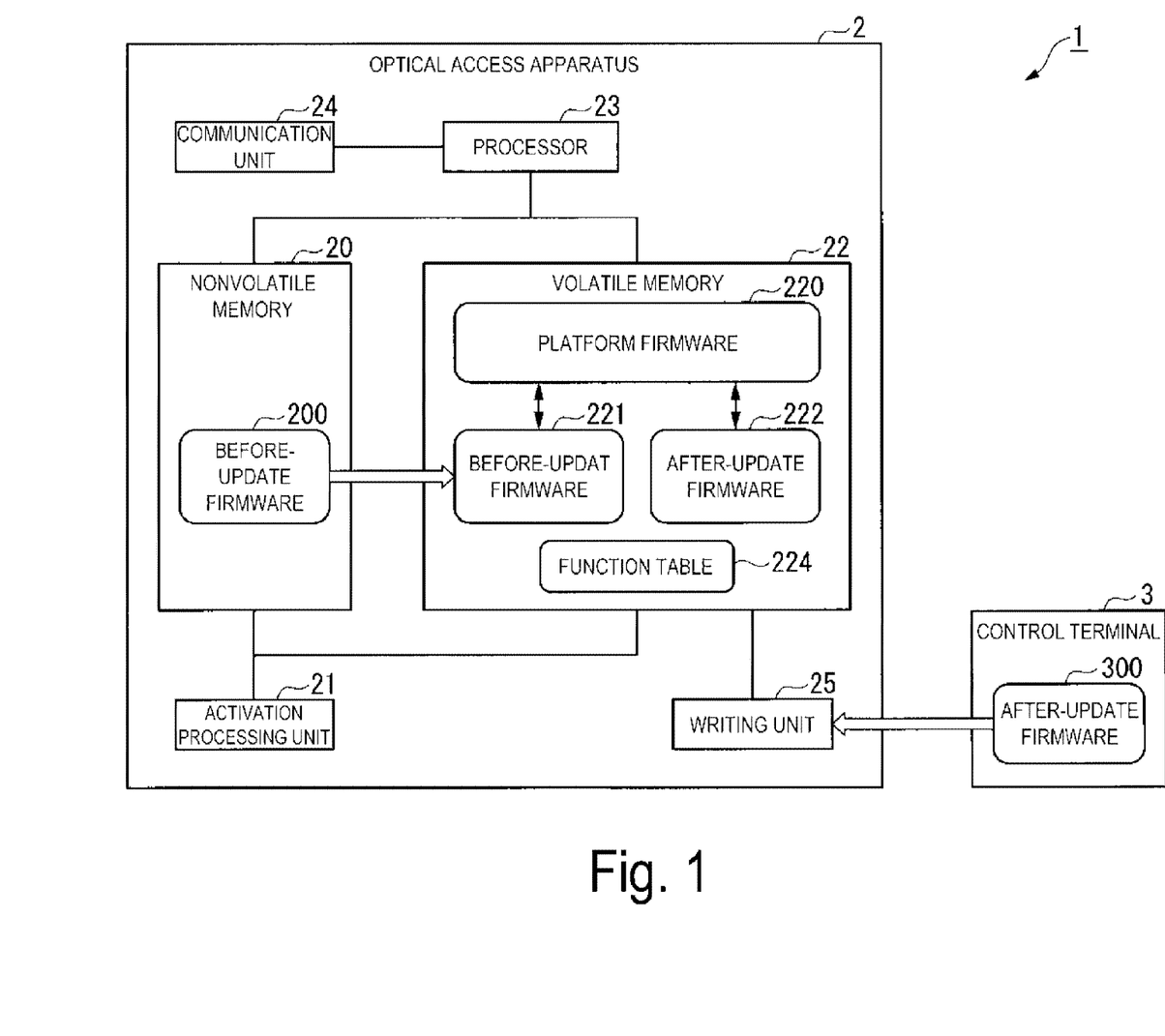
FIG. 1 is a diagram showing an example of the configuration of an optical communication system 1 according to a first embodiment.

FIG. 1 is a diagram showing one example of the configuration of an optical communication system 1 according to the first embodiment. The optical communication system 1 is a system that communicates using an optical signal. The optical communication system 1 includes an optical access apparatus 2 (communication device) and a control terminal 3.

Note that the optical communication system 1, which includes the optical access apparatus 2 to communicate with a different communication apparatus such as an optical network unit (ONU) by using an optical signal, is described as one example herein, but there is no limitation thereto. The optical communication system 1 may be a different communication apparatus or a communication system, which communicates in a different way other than optical communication.

The optical access apparatus 2 includes a nonvolatile memory 20, an activation processing unit 21, a volatile memory 22, a processor 23, a communication unit 24, and a writing unit 25.

The control terminal 3 is an information processing apparatus such as a personal computer. The control terminal 3 stores after-update firmware 300. The after-update firmware 300 and a before-update firmware 200 described later are, for example, firmware for the optical access apparatus 2 to execute optical communication.

If the control terminal 3 has accidentally written the after-update firmware 300 to the volatile memory 22 while before-update firmware 221 is being used by the processor 23, unexpected abnormality may occur in the optical access apparatus 2. Thus, the optical access apparatus 2 writes the after-update firmware 300 as after-update firmware 222 in a free region of the volatile memory 22 so that the before-update firmware 221 stored in the volatile memory 22 is not rewritten. Writing the after-update firmware 222 in a free region of the volatile memory 22 allows the optical access apparatus 2 to write the after-update firmware 222 in the volatile memory 22 even while the before-update firmware 221 is being used by the processor 23.

Moreover, the optical access apparatus 2 updates the firmware by changing the call destination of the functions (first data) of the before-update firmware 221 to the functions (secondary data) in the after-update firmware 222. Note that a target whose callee is changed is not limited to function data and may be, for example, other data such as programs. In the following description, a case where the callee of a function is changed will be described as one example.

Hereinafter, the details of the optical access apparatus 2 will be described. The activation processing unit 21 is implemented using hardware such as a large scale integration (LSI) or an application specific integrated circuit (ASIC). The activation processing unit 21 writes the before-update firmware 200 stored in the nonvolatile memory 20 into the volatile memory 22 as the before-update firmware 221 when the optical access apparatus 2 is activated and before the processor 23 is activated. The before-update firmware 200 is, for example, firmware for the optical access apparatus 2 to execute optical communication.

The activation processing unit 21 also writes platform firmware 220 stored in a nonvolatile recording medium such as the nonvolatile memory 20 into the volatile memory 22 when the optical access apparatus 2 is activated and before the processor 23 is activated. The description of a case where the nonvolatile memory 20, serving as one example of a nonvolatile recording medium, is applied is continued hereinafter. The platform firmware 220 is, for example, firmware such as an operating system.

The nonvolatile memory 20 is, for example, a read-only recording medium such as a read-only memory (ROM). Alternatively, the nonvolatile memory 20 may be a rewritable flash ROM. The nonvolatile memory 20 stores the before-update firmware 200. The nonvolatile memory 20 does not store the after-update firmware 222. Hereinafter, even when the before-update firmware 200 is referred to from the processor 23 in a state where the before-update firmware 200 is stored in the nonvolatile memory 20, the before-update firmware 200 is stored in the nonvolatile memory 20 in a state where the processor 23 can operate. That is, binary data of the before-update firmware 200 is the same as binary data of the before-update firmware 221.

The volatile memory 22 is, for example, a volatile recording medium such as a random access memory (RAM) capable of being read from and written to. The volatile memory 22 stores the platform firmware 220 in accordance with a write operation by the activation processing unit 21 when the optical access apparatus 2 is activated. The volatile memory 22 stores the before-update firmware 221 in accordance with the write operation by the activation processing unit 21 when the optical access apparatus 2 is activated and before the processor 23 is activated. The volatile memory 22 has a free region with sufficient capacity even when the platform firmware 220 and the before-update firmware 221 are stored in the volatile memory 22. The sufficient capacity means capacity which enables at least the after-update firmware 222 to be stored. After the processor 23 is activated, the volatile memory 22 stores the after-update firmware 300 output by the control terminal 3 in the free region of the volatile memory 22 as the after-update firmware 222.

The before-update firmware 221 includes a reference destination of a function. The function is associated with a head address of the function in the volatile memory 22. The after-update firmware 222 includes a new reference destination of the function. The function is associated with a head address of the function in the volatile memory 22.

The volatile memory 22 further stores a function table 224. The function table 224 is data in table format in which functions are associated with head addresses of the functions in the volatile memory 22. Note that the function table 224 may be alternatively included in any one of the platform firmware 220, the before-update firmware 221, or the after-update firmware 222.

The writing unit 25 is implemented using hardware such as an LSI or an ASIC. The writing unit 25 may be implemented by software. In this case, for example, a program for implementing the functions of the writing unit 25 is included in the platform firmware 220 (OS), and the software is implemented in accordance with a system call of the OS. Based on a writing request output by the control terminal 3, the writing unit 25 determines whether the after-update firmware 222 can be written into the free region of the volatile memory 22. Herein, the writing request includes information indicating the size of the after-update firmware 222.

Specifically, the writing unit 25 determines whether the free region of the volatile memory 22 is equal to or larger than the size of the after-update firmware 222 based on the size of the after-update firmware 222 included in the writing request. The writing unit 25 writes the after-update firmware 222 into the volatile memory 22 when the free region of the volatile memory 22 is equal to or larger than the size of the after-update firmware 222. On the other hand, the writing unit 25 does not write the after-update firmware 222 into the volatile memory 22 when the free region of the volatile memory 22 is smaller than the size of the after-update firmware 222. Note that the writing unit 25 may notify of that the free region of the volatile memory 22 is less than the size of the after-update firmware 222 when the free region of the volatile memory 22 is smaller than the size of the after-update firmware 222.

The writing unit 25 also rewrites a value of the head address included in the function table 224 based on the writing request output by the control terminal 3.

The processor 23 executes operation based on the platform firmware 220 stored in the volatile memory 22. The processor 23 also executes operation in accordance with the before-update firmware 221 or the after-update firmware 222 based on the function table 224. Specifically, the processor 23 refers to the function table 224 to retrieve the head address of the function included in the before-update firmware 221. Then, the processor 23 executes the function positioned at the retrieved head address.

The communication unit 24 communicates with a different communication apparatus, such as an ONU, by using an optical signal in response to control by the processor 23 that executes the operation in accordance with the before-update firmware 221 or the after-update firmware 222.

Indirect Reference by Optical Access Apparatus

Figure 2:
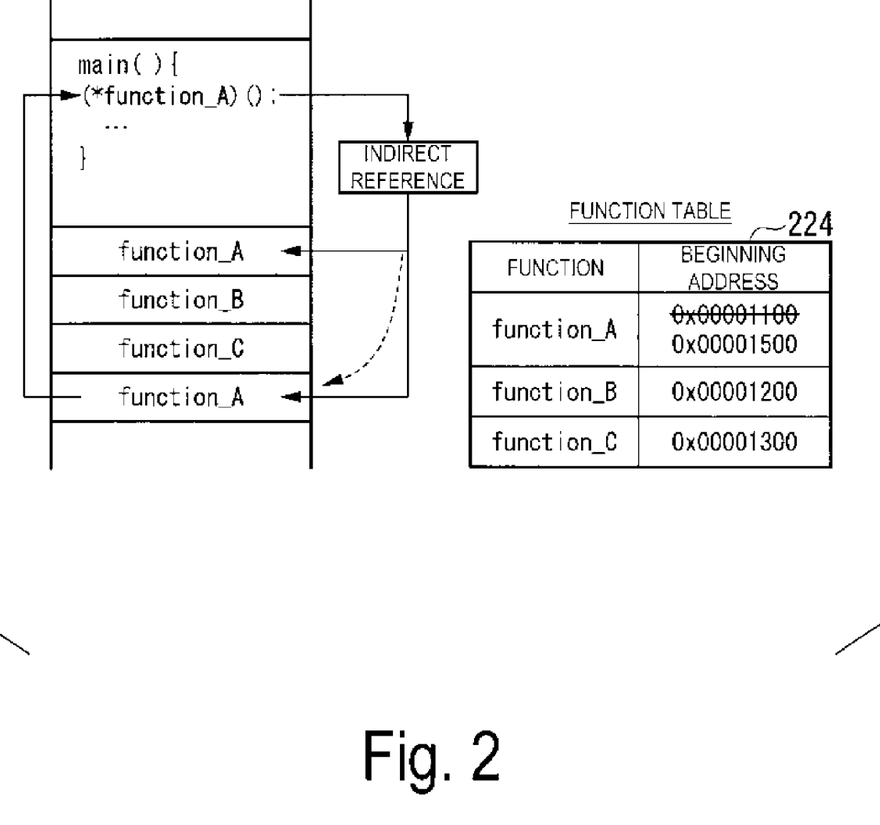
FIG. 2 is a diagram showing an example of indirect reference in an optical access apparatus 2 according to the first embodiment.

FIG. 2 is a diagram showing one example of indirect reference in the optical access apparatus 2 according to the first embodiment.

The volatile memory 22 stores the function table 224 in advance. The function table 224 is generated, for example, by the processor 23 using a function pointer and stored in the volatile memory 22. Accordingly, information indicating the head address of each function included in the before-update firmware 221 is stored in the function table 224.

If a function is called by the program being executed, the processor 23 refers to the function table 224 to retrieve the head address of the called function. The processor 23 shifts the processing to the retrieved head address.

When updating the firmware, the writing unit 25 rewrites the value of the head address of the function defined in the function table 224 in response to the writing request from the control terminal 3.

As shown in FIG. 2, "function_A" and "0x00001500, which is the head address of "function_A", are stored in association with each other in the function table 224. Similarly, in the function table 224, "function_B" and "0x00001200", which is the head address of "function_B", are stored in association with each other, and "function_C" and "0x00001300", which is the head address of "function_C", are stored in association with each other.

As shown in FIG. 2, "0x00001500", which is the head address of "function_A" and is defined in the function table 224, is a value rewritten by the writing unit 25 from "0x00001100". That is, the head address of the function "function_A" included in the before-update firmware is "0x00001100", and the head address of the function "function_A" included in the after-update firmware is "0x00001500".

With the configuration above, the optical access apparatus 2 updates the firmware by performing indirect processing for calling the desired function via the function table 224. Accordingly, the optical access apparatus 2 can change the processing without overwriting the program in operation. Thus, according to the optical access apparatus 2, it is possible to ensure stability during the firmware update because the data in the volatile memory 22 is rewritten while the memory protection function of the basic software (operating system (OS)) is avoided.

Operation of Optical Access Apparatus

Figure 3:
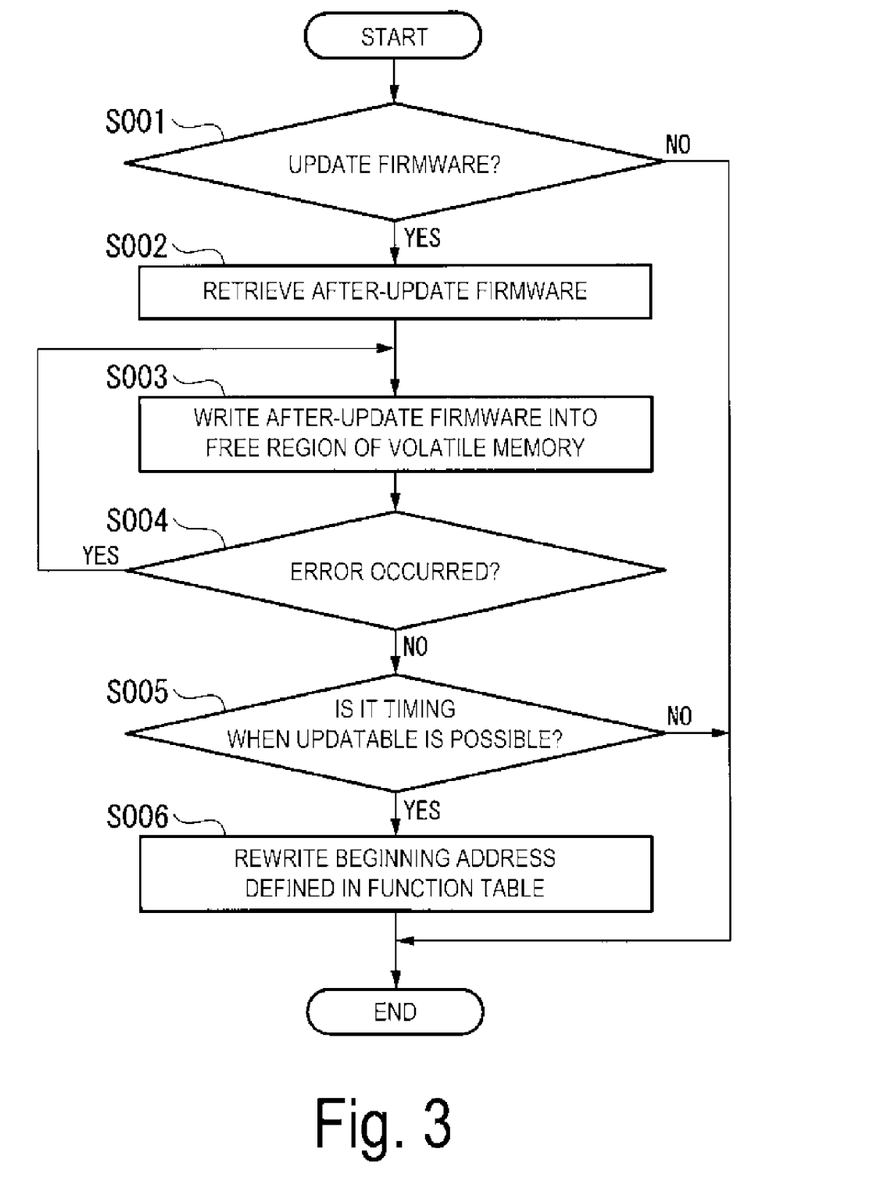
FIG. 3 is a flowchart showing an example of the operation of the optical access apparatus 2 according to the first embodiment.

FIG. 3 is a flowchart showing one example of the operation of the optical access apparatus 2 according to the first embodiment.

The processor 23 determines whether or not to update the firmware (Step S001). When new functions are added the firmware in operation, when existing functions are changed in the firmware in operation, or when bugs are fixed in the firmware in operation (YES in Step S001), the processor 23 determines to update the firmware. If not (NO in Step S001), the processor 23 determines not to update the firmware and ends the processing shown by the flowchart.

When the processor 23 has determined to update the firmware (YES in Step S001), the writing unit 25 retrieves the after-update firmware 300 output from the control terminal 3 (Step S002). Note that, to generate the after-update firmware 300 in the control terminal 3 and the like, it is necessary to generate in advance additional information such as a memory map of the after-update firmware 300, which will be required later, and then retrieve the additional information together with the after-update firmware 300 by the optical access apparatus 2.

The writing unit 25 writes the retrieved after-update firmware 300 into the free region of the volatile memory 22 as the after-update firmware 222 (Step S003). As previously mentioned, the after-update firmware 222 is written into the free region of the volatile memory 22, thereby preventing the before-update firmware 221 being executed from being overwritten.

In order to complete the firmware update without failure, the processor 23 confirms whether or not the deployment of the after-update firmware 222 in the volatile memory 22 has been completed without errors, before the processing is shifted from the before-update firmware 221 to the after-update firmware 222 (Step S004). When it has been confirmed that an error has occurred (YES in Step S004), the processor 23 again writes the retrieved after-update firmware 300 into the free region of the volatile memory 22 as the after-update firmware 222 (Step S003).

When it has been confirmed that no error has occurred (NO in Step S004), the processor 23 determines whether or not it is timing at which the firmware can be updated (Step S005). To safely execute firmware update, it is necessary to check the processing status of the program in operation and appropriately determine the timing at which the firmware is updated. Note that the criteria for determining whether or not it is timing at which the firmware can be updated will be described in detail later.

The update timing is determined at an updating point that is incorporated into the firmware in advance. For each cycle in which the program is executed, the processor 23 checks the presence or absence of an update flag at the updating point.

When it has been determined based on the update flag that it is not the timing at which the firmware can be updated (NO in Step S005), the processor 23 ends the processing shown by the flowchart. When it has been determined based on the update flag that it is the timing at which the firmware can be updated (YES in Step S005), the writing unit 25 rewrites the value of the head address of the function defined in the function table 224 (Step S006). Then, the processor 23 ends the processing shown by the flowchart.

Figure 4:
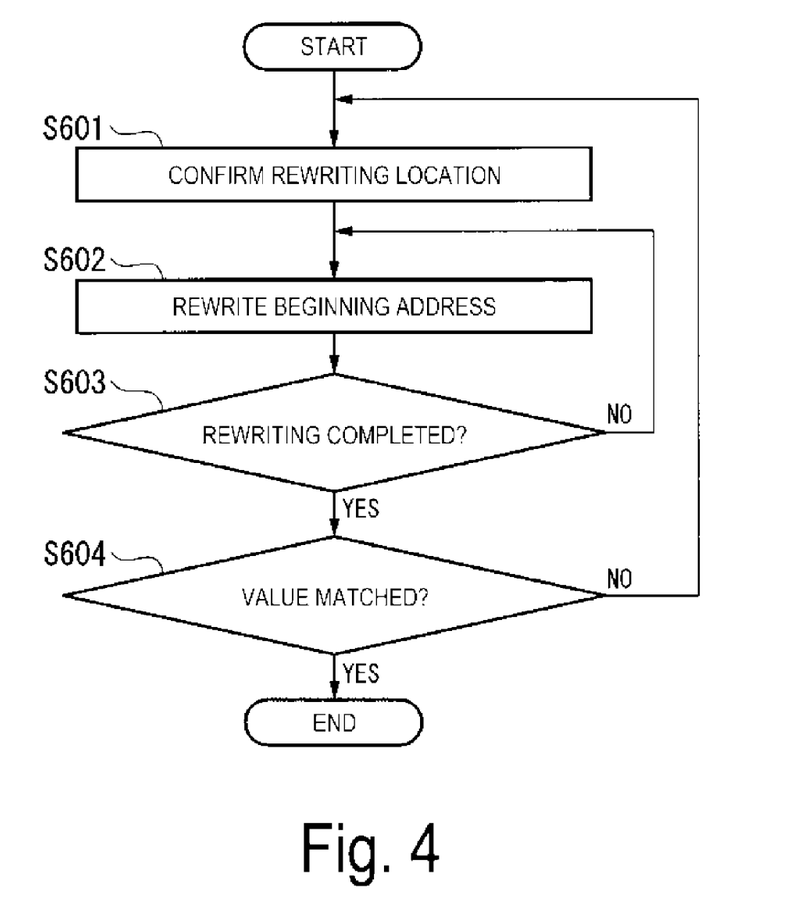
FIG. 4 is a flowchart showing an example of the operation of the optical access apparatus 2 according to the first embodiment.

The flowchart shown in FIG. 4 is a flowchart showing the more detailed operation of the optical access apparatus 2 in the processing of rewriting the head address defined in the function table 224 (i.e., the processing of Step S006 in FIG. 3).

When updating the firmware, it is necessary to rewrite the value of the head address of the function defined in the function table 224 stored in the volatile memory 22. However, if the value of the rewritten head address is incorrect, the program may stop abnormally. Thus, before rewriting the value of the head address, the writing unit 25 confirms that the rewriting location (the position of the head address of the function to be updated in the volatile memory 22) is present in a rewritable area (Step S601).

The writing unit 25 rewrites, in order, the value of the head address of the function to be updated in the function table 224 (Step S602). When there are a plurality of functions to be updated, the writing unit 25 rewrites, one by one in order, the values of the head addresses of the functions to be updated.

When there is a function to be updated in which the rewriting of the value of the head address of the function has not been completed (NO in Step S603), the writing unit 25 continues the processing of rewriting the value of the head address of the function to be updated in the function table 224 (Step S602).

When the rewriting of the value of the head address has been completed for all the functions to be updated (YES in Step S603), the writing unit 25 checks whether or not the value of the head address of the function, which is to be updated and deployed on the volatile memory 22, matches the value of the head address, which is associated with the function and rewritten in the function table 224.

When the values of both of the head addresses do not match (NO in Step S604), the processor 23 again executes the processing of rewriting the head address defined in the function table 224 (i.e., the processing of Step S006 in FIG. 3). When the values of both of the head addresses match (YES in Step S604), the processor 23 ends the processing shown by the flowchart.

Criteria for Update Timing

Hereinafter, the criteria for determining whether it is the timing at which the firmware can be updated will be described.

The updating point is incorporated at any of the timing described below in the periodic processing executed in the platform firmware 220. Then, at every cycle or periodically, confirmation is made as to whether it is necessary to update the firmware at the timing of the incorporated update point. When it is necessary to update the firmware, the firmware is updated.

Figure 5:
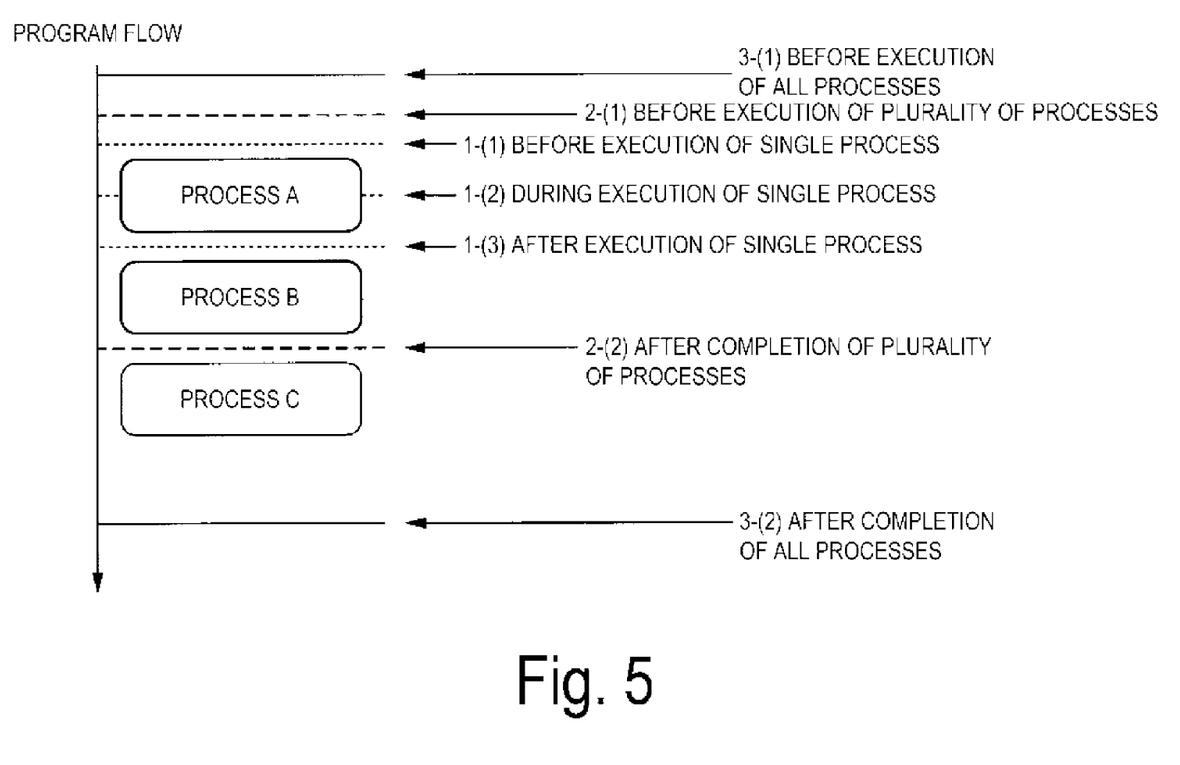
FIG. 5 is a schematic diagram for explaining the correspondence between a processing status of a process and update timing.

FIG. 5 is a schematic diagram for explaining the correspondence between the processing status of the process and the update timing. Note that the process referred herein corresponds to, for example, the function included in the firmware.

Updating Firmware for Single Process

For example, in a case where only a "process A" shown in FIG. 5 is to be updated, the following three types of update timing are conceivable. In the firmware, an updating point is incorporated in advance at any one or a plurality of the following types of update timing:

1-(1) Before Execution of Single Process
1-(2) During Execution of Single Process
1-(3) After Execution of Single Process To fix a small bug, fix a patch, or the like, the update range can be narrowed by updating the firmware for a single process. Accordingly, the firmware update for the single process can advantageously reduce the range that the firmware update affects.

When the firmware has been updated by rewriting indirect reference before or after the single process (i.e., the timing of 1-(1) or 1-(3) shown in FIG. 5), the firmware update is reflected from the next process execution. Moreover, when the firmware is updated during the execution of the process to be updated (i.e., the timing of 1-(2) shown in FIG. 5), the firmware update is reflected from the next process execution after the process, which is being executed and is to be updated, is completed.

Note that the change is reflected before the execution of the process so that the firmware update by rewriting the indirect reference destination advantageously does not affect the process during the execution.

Updating Firmware for Plurality of Processes

For example, in a case where two processes, the "process A" and a "process B" shown in FIG. 5, are to be updated, the following two types of update timing are conceivable. In the firmware, an updating point is incorporated in advance at any one or both of the following types of update timing:

2-(1) Before Execution of Plurality of Processes
2-(2) After Execution of Plurality of Processes When the head address defined in the function table 224 has been rewritten during the execution of the plurality of processes, there is the possibility of not being able to hand over normal data between the processes.

Thus, by updating the firmware collectively before all of the plurality of processes to be updated are executed or after all of the plurality of processes to be updated are executed, the operation of the optical access apparatus 2 before and after the firmware update can be stabilized.

Updating Firmware for all Processes

To change the entire program to be updated (e.g., when the "process A", the "process B", and a "process C" shown in FIG. 5 are all to be updated), the update is preferably performed before the execution of all the processes or after the execution of all the processes as described below from the viewpoint of preventing failures during the update.

3-(1) Before Execution of All Processes
3-(2) After Execution of All Processes

Rewriting the data in the volatile memory 22 during the execution of the program causes memory errors, with a possibility of crashing the program becoming very high. On the other hand, the possibility of the occurrence of memory errors can be relatively low if the timing is before the execution of all the processes of the program to be updated or after the execution of all the processes of the program to be updated. Therefore, updating the firmware at the above timing of 3-(1) and 3-(2) enables safe shift to the after-update firmware.

As described above, the optical access apparatus 2 according to the first embodiment includes the volatile memory 22 and the processor 23. The volatile memory 22 stores the function (first data) included in the before-update firmware 221, the function (second data) included in the after-update firmware 222, and the function table 224. The function table 224 is a table in which the function included in the before-update firmware 221 or the function included in the after-update firmware 222 is associated with the address where the function included in the before-update firmware 221 or the function included in the after-update firmware 222 is positioned in the volatile memory 22. Moreover, the processor 23 executes the processing based on the function included in the before-update firmware 221 or function included in the after-update firmware 222, which are positioned at the address defined in the function table 224.

Furthermore, the optical access apparatus 2 according to the first embodiment further includes the writing unit 25. The writing unit 25 rewrites the address, which is associated with the function included in the before-update firmware 221 in the function table 224, to the address where the function included in the after-update firmware 222 is positioned in the volatile memory 22.

The writing unit 25 also rewrites the address in accordance with the update timing defined in the before-update firmware 200.

The writing unit 25 further writes the after-update firmware 222 into the free region of the volatile memory 22.

The above configuration enables the optical access apparatus 2 according to the first embodiment to update the firmware without interrupting the provision of the communication service by incorporating indirect processing (indirect reference) into the firmware. The above configuration also enables the optical access apparatus 2 according to the first embodiment to realize the firmware update without interrupting the communication service at lower costs than the known method of making an apparatus redundant.

Second Embodiment

Hereinafter, a second embodiment according to the present invention will be described.

As shown in FIG. 4, in the first embodiment described above, the optical access apparatus 2 is configured to rewrite, one by one in order, the value of the head address defined in the function table 224 for each function to be updated. With this configuration, when there are many functions to be updated, it takes time to update the firmware in some cases.

On the other hand, when an optical access apparatus 6 (communication device) according to the second embodiment described hereinafter updates firmware, values of head addresses of functions to be updated are collectively updated in units of function tables. Accordingly, the values of the head addresses of all the functions to be updated are collectively rewritten in single processing. Thus, in the case where there are many functions to be updated in particular, the optical access apparatus 6 can further reduce the time required to update the firmware compared with the optical access apparatus 2 according to the first embodiment described above.

Configuration of Optical Communication System

Figure 6:
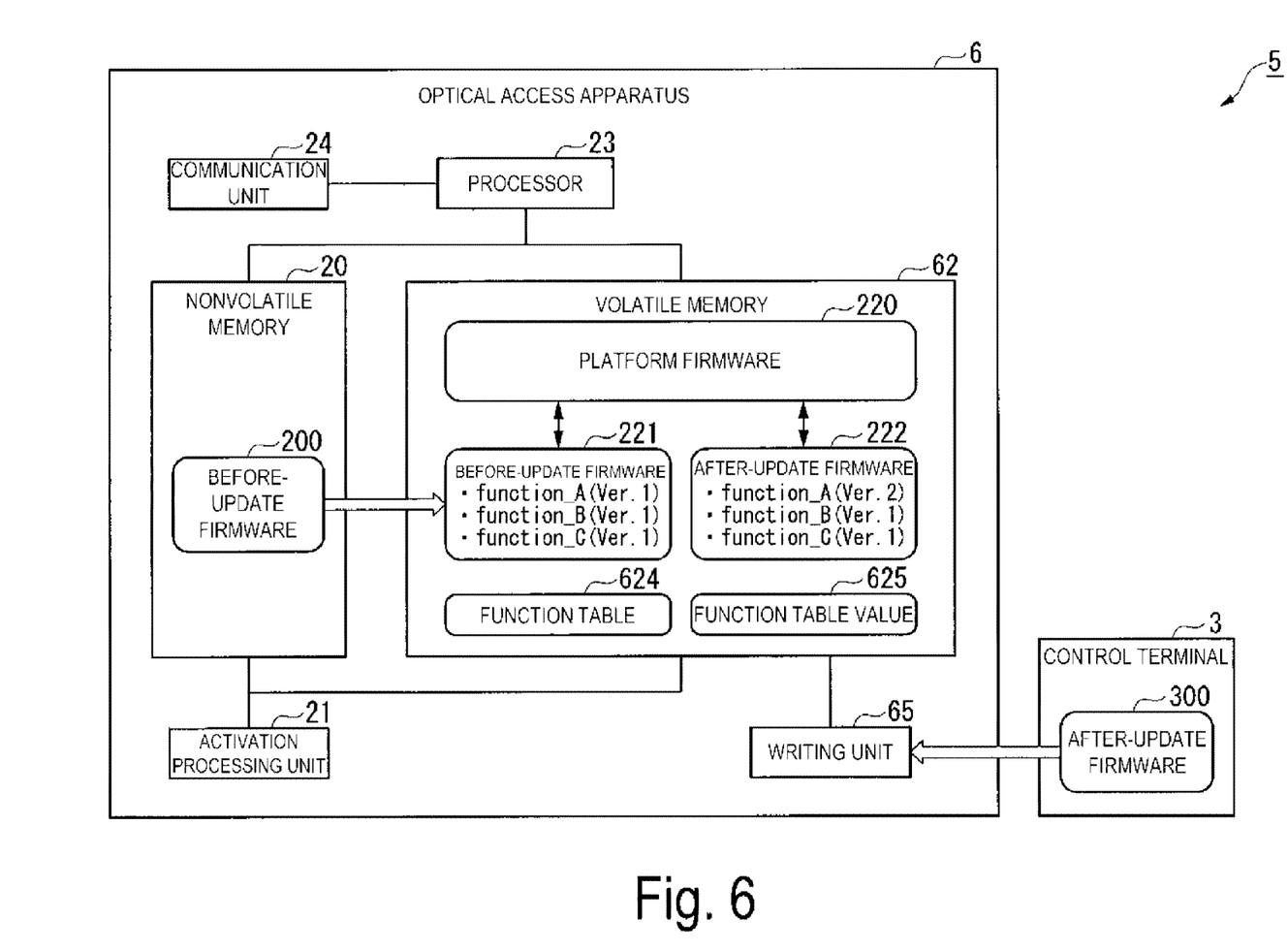
FIG. 6 is a diagram showing an example of the configuration of an optical communication system 5 according to a second embodiment.

FIG. 6 is a diagram showing one example of the configuration of an optical communication system 5 according to the second embodiment. Similar to the optical communication system 1 according to the first embodiment described above, the optical communication system 5 is a system that communicates using an optical signal. The optical communication system 5 includes the optical access apparatus 6 and a control terminal 3.

The optical access apparatus 6 includes a nonvolatile memory 20, an activation processing unit 21, a volatile memory 62, a processor 23, a communication unit 24, and a writing unit 65.

Note that, among the functional blocks of the optical communication system 5, functional blocks common in function with the functional blocks of the optical communication system 1 according to the first embodiment described above are denoted by the same reference signs, and will not be further described.

The volatile memory 62 stores platform firmware 220, before-update firmware 221, after-update firmware 222, a function table 624, and a function table value 625.

Based on a writing request output from the control terminal 3, the writing unit 65 causes the volatile memory 62 to store the after-update firmware 222, the function table 624, and the function table value 625.

Unlike the function table 224 described in the first embodiment in which the head address of each function is defined for only one function group, the function table 624 is a table in which a head address of each function of each function group for each function table value that could be set for the function table value 625 is defined. Note that the configuration of the function table 624 and the function table value 625 are described in detail later.

By referring to the function table 624 and the function table value 625, the processor 23 retrieves the head address value of the function to be executed in the volatile memory 62 and executes the firmware.

Indirect Reference by Optical Access Apparatus

Figure 7:
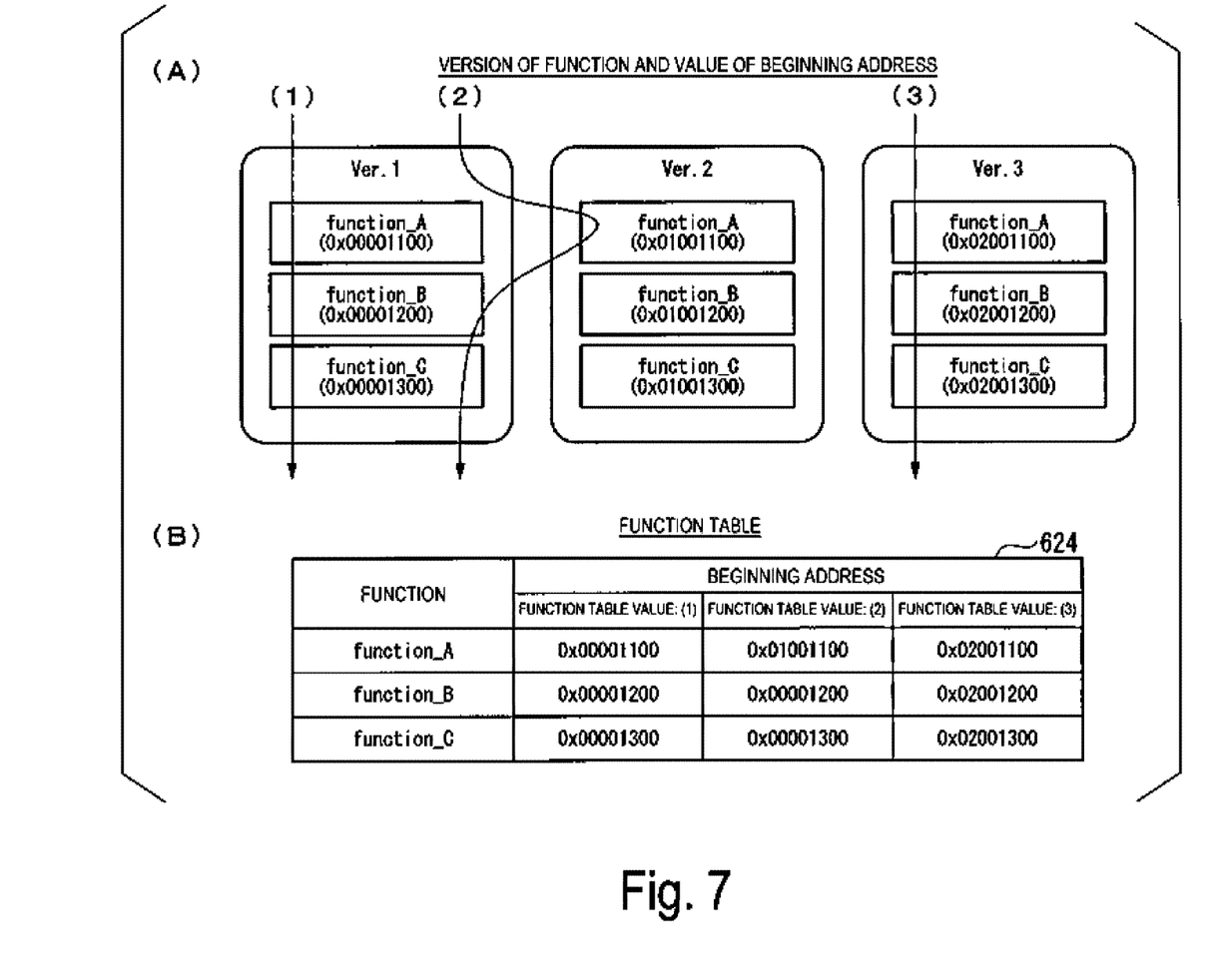
FIG. 7 is a set of diagrams showing an example of indirect reference in an optical access apparatus 6 according to the second embodiment.

FIG. 7 is a set of diagrams showing an example of indirect reference in the optical access apparatus 6 according to the second embodiment.

FIG. 7 (A) shows the association between the version of each function and the value of the head address. From the left, a function group consisting of functions of Version 1 (Ver. 1), a function group consisting of functions of Version 2 (Ver. 2), and a function group consisting of functions of Version 3 (Ver. 3) are shown. That is, the functions of Version 1 (Ver. 1) are functions included in the before-update firmware 221, and the functions of Version 2 (Ver. 1) and Version 3 (Ver. 3) are functions included in the after-update firmware 222. Note that the functions of Version 3 (Ver. 3) may be included in firmware that further updates the after-update firmware 222, not in the after-update firmware 222 that includes the functions of Version 2 (Ver. 2).

For example, the leftmost function group includes a function "function_A" of Version 1, a function "function_B" of Version 1, and a function "function_C" of Version 1. As shown in FIG. 7 (A), in the volatile memory 62, the value of the head address of the function "function_A" of Version 1 is "0x00001100", the value of the head address of the function "function_B" of Version 1 is "0x00001200", and the value of the head address of the function "function_C" of Version 1 is "0x00001300".

FIG. 7 (B) shows an example of the configuration of the function table 624. As shown in the drawing, the head addresses of the respective functions ("function_A", "function_B", and "function_C") of the function groups are each defined for the respective function table values ((1) to (3)) in the function table 624.

As shown in FIG. 7 (B), for example, if the value set to the function table value 625 is (1), the value of the address in the volatile memory 62, which is referred by the processor 23 when the function "function_A" is called, is "0x00001100". That is, the processing of the function "function_A" of Version 1 is executed. Similarly, if the value set to the function table value 625 is (1), the processing of the function "function_B" of Version 1 is executed when the function "function_B" is called, and the processing of the function "function_C" of Version 1 is executed when the function "function_C" is called.

Moreover, as shown in FIG. 7 (B), for example, if the value set for the function table value 625 is (2), the value of the address in the volatile memory 62, which is referred by the processor 23 when the function "function_A" is called, is "0x01001100". That is, the processing of the function "function_A" of Version 2 is executed. Similarly, if the value set to the function table value 625 is (2), the processing of the function "function_B" of Version 1 is executed when the function "function_B" is called, and the processing of the function "function_C" of Version 1 is executed when the function "function_C" is called.

That is, for example, a case where the value of the function table value 625 is changed from (1) to (2) indicates that only the function "function_A" is changed from Version 1 to Version 2, the function "function_B" and the function "function_C" of Version 1 remain, and the processing will be executed.

Furthermore, as shown in FIG. 7 (B), for example, if the value set to the function table value 625 is (3), the value of the address in the volatile memory 62, which is referred by the processor 23 when the function "function_A" is called, is "0x02001100". That is, the processing of the function "function_A" of Version 3 is executed. Similarly, if the value set to the function table value 625 is (3), the processing of the function "function_B" of Version 3 is executed when the function "function_B" is called, and the processing of the function "function_C" of Version 3 is executed when the function "function_C" is called.

That is, for example, a case where the value of the function table value 625 is changed from (1) to (3) indicates that all the functions "function_A", "function_B", and "function_C" are changed from Version 1 to Version 3, and the processing will be executed.

The three arrows shown in FIG. 7 (A) are illustrated to show the respective functions executed when (1) is set to the value of the function table value 625, when (2) is set to the value of the function table value 625, and when (3) is set to the value of the function table value 625.

As described above, the function table 624 includes information (first information), in which the functions included in the before-update firmware 221 are associated with the addresses, and information (second information), in which the functions included in the after-update firmware 222 are associated with the addresses. In addition, the function table value 625 corresponds to identification information for identifying whether to execute the functions included in the before-update firmware 221 or to execute the functions included in the after-update firmware 222.

By using the function table 624 and the function table values 625 having the configurations described above, the optical access apparatus 6 can collectively rewrite the values of the head addresses of all the functions to be updated in single processing.

Operation of Optical Access Apparatus

Figure 8:
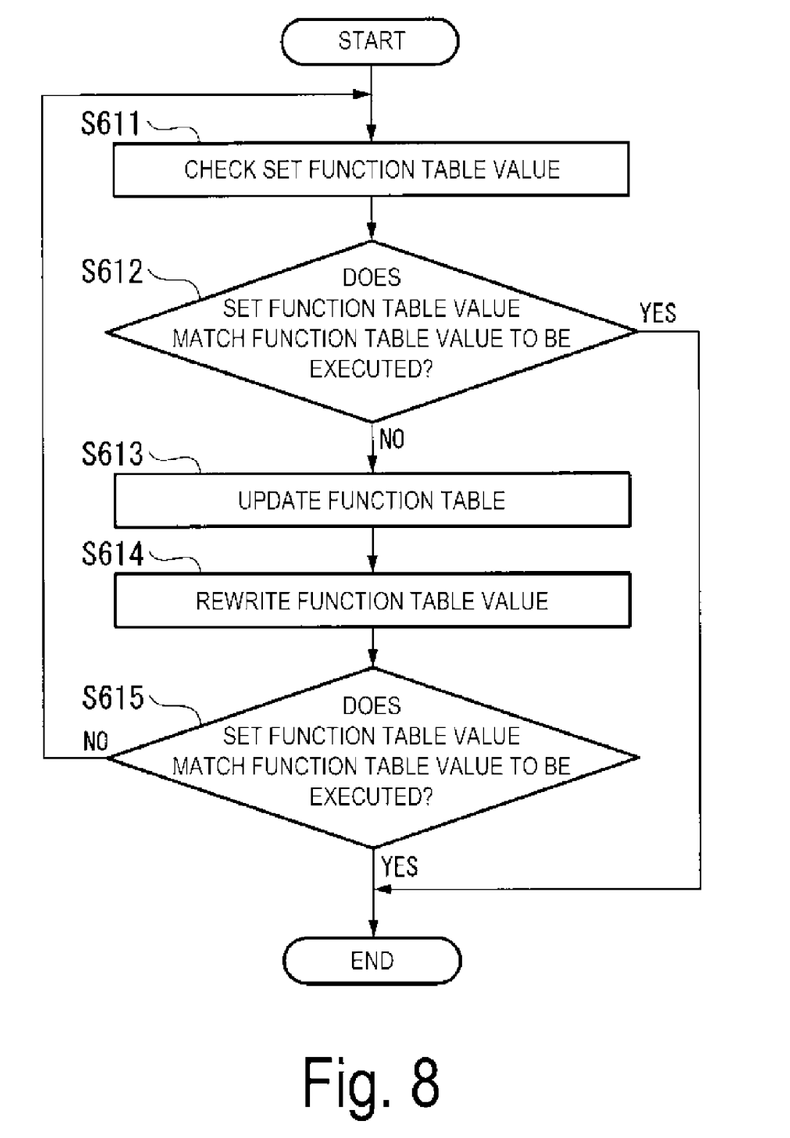
FIG. 8 is a flowchart showing an example of the operation of the optical access apparatus 6 according to the second embodiment.

FIG. 8 is a flowchart showing one example of the operation of the optical access apparatus 6 according to the second embodiment.

Note that the processing in the optical access apparatus 6 according to the second embodiment is similar to the processing of Steps S001 to S005 in the flowchart showing the operation of the optical access apparatus 2 according to the first embodiment as shown in FIG. 3, and thus the description thereof will be omitted. Accordingly, the flowchart shown in FIG. 8, which is described below, is a flowchart showing the more detailed operation of the optical access apparatus 6 in the processing of rewriting the head address defined in the function table 624 (i.e., the processing corresponding to Step S006 in FIG. 3).

The writing unit 65 checks the value of the function table value 625 stored in the volatile memory 82 (Step S611). The writing unit 65 determines whether the value of the set function table value 625 matches the function table value (not shown) in the processing to be executed (Step S612). The function table value (not shown) in the processing to be executed is stored in, for example, a storage medium including the volatile memory 22 or the like.

When the value of the set function table value 625 matches the function table value in the processing to be executed (YES in Step S612), the processor 23 ends the processing shown by the flowchart. When the value of the set function table value 625 does not match the function table value in the processing to be executed (NO in Step S612), the writing unit 65 updates the function table 624 (Step S613). Note that only the difference may be alternatively added or changed instead of updating the entire function table 624.

The writing unit 65 rewrites the function table value (not shown) in the processing to be executed to the value set to the function table value 625 (Step S614). The writing unit 65 checks whether the value set to the function table value 625 matches the function table value (not shown) in the processing to be executed (Step S615).

When the value set to the function table value 625 does not match the function table value (not shown) in the processing to be executed (NO in Step S615), the writing unit 65 again performs the processing of updating the function table 624 and the function table value 625. When the value set to the function table value 625 matches the function table value (not shown) in the processing to be executed (YES in Step S615), the processor 23 ends the processing shown by the flowchart.

As described above, the optical access apparatus 6 according to the second embodiment includes the volatile memory 62 and the processor 23. The volatile memory 62 stores the functions (first data) included in the before-update firmware 221, the functions (second data) included in the after-update firmware 222, the function table 624, and the function table value 625. The function table 624 includes the first information, in which the functions included in the before-update firmware 221 are associated with the addresses where the functions included in the before-update firmware 221 are positioned, and the second information, in which the functions included in the after-update firmware 222 are associated with the addresses where the functions included in the after-update firmware 222 are positioned. The function table value 625 is a value for identifying the functions included in the after-update firmware 222 and the functions included in the after-update firmware 222. The processor 23 executes the processing based on the functions included in the before-update firmware 221 or the functions included in the after-update firmware 222, which are positioned at the addresses defined in the first information or the second information identified by the function table value 625 stored in the volatile memory 62.

The configuration above makes the optical access apparatus 6 according to the second embodiment collectively update the values of the head addresses of the functions to be updated in units of function tables when the firmware is updated. Accordingly, the values of the head addresses of all the functions to be updated are collectively rewritten in single processing. Thus, in the case where there are many functions to be updated in particular, the optical access apparatus 6 can further reduce the time required to update the firmware compared with the optical access apparatus 2 according to the first embodiment described above.

The above-described configuration enables the optical communication system according to each of the embodiments to update the firmware without interrupting the provision of the communication service by incorporating indirect processing (indirect reference) within the firmware.

As an approach to updating firmware by indirect reference, an approach to directly rewriting the beginning memory address saved in the function table has been described in the first embodiment. Moreover, as a more effective approach when there are many functions to be updated in particular, an approach to holding a plurality of function table values in the function table and changing the function table values to change versions of the functions to be executed has been described in the second embodiment.

For the application of the above-described approaches, the configuration, in which the updating point is incorporated in advance into the firmware to appropriately determine the update timing of the firmware in the optical communication system according to each of the embodiments, has been described. This configuration enables the optical communication system according to each of the embodiments described above to update the firmware without interrupting the service and without causing an abnormal stop or the like of the program.

For example, by enabling firmware to be updated without interrupting the service, functional additions and functional changes involved in fixing a bug in the firmware and the provision of new service can be facilitated.

Furthermore, in the known case of updating firmware, service providing operators have to notify users of the service in advance or perform update work at night to less affect the users. However, enabling the firmware to be updated without interrupting the service makes the work described above unnecessary for the operators. Accordingly, for example, a cost reduction effect related to maintenance and operation of the communication facilities is expected.

The firmware update methods described in the above respective embodiments can realize a firmware update without interrupting the communication service at lower costs than the known method of making an apparatus redundant.

Note that part or all of the optical access apparatus 2 or the optical access apparatus 6 according to the embodiments described above may be implemented by a computer. In such a case, part or all of the optical access apparatus 2 or the optical access apparatus 6 may be implemented by recording a program for implementing their functions in a computer-readable recording medium, and causing a computer system to read and execute the program recorded in the recording medium. Note that the "computer system" as used herein includes an OS and hardware such as a peripheral device. The "computer-readable recording medium" refers to a portable medium such as a flexible disk, a magneto-optical disk, a ROM, and a CD-ROM, and a storage apparatus such as a hard disk installed in a computer system. Further, the "computer-readable recording medium" may also include such a medium that stores programs dynamically for a short period of time, one example of which is a communication line used when a program is transmitted via a network such as the Internet and a communication line such as a telephone line, and may also include such a medium that stores programs for a certain period of time, one example of which is volatile memory inside a computer system that functions as a server or a client in the above-described case. Further, the above program may be a program for implementing a part of the above-mentioned functions. The above program may be a program capable of implementing the above-mentioned functions in combination with another program already recorded in a computer system. The above program may be a program to be implemented with the use of a programmable logic device such as a field programmable gate array (FPGA).

The embodiments of the present invention have been described above in detail with reference to the drawings. Specific configurations, however, are not limited to those embodiments, and include any design or the like within the scope without departing from the gist of the present invention.

REFERENCE SIGNS LIST

1 Optical communication system
2, 6 Optical access apparatus (communication device)
3 Control terminal
20 Nonvolatile memory
21 Activation processing unit
22, 62 Volatile memory
23 Processor
24 Communication unit
25, 65 Writing unit
200, 221 Before-update firmware
220 Platform firmware
222, 300 After-update firmware
224, 624 Function table
625 Function table value

The invention claimed is:

1. A communication apparatus, comprising:
a processor; and
a storage medium having computer program instruction stored thereon, wherein the computer program instructions, when executed by the processor, perform to:
store first data indicating a function included in firmware before update, second data indicating the function included in firmware after the update and a table in which the first data or the second data is associated with an address where the first data or the second data is positioned;
execute processing based on the first data or the second data positioned at the address defined in the table; and
rewrite the address associated with the first data in the table to the address where the second data is positioned, in accordance with update timing defined in the firmware before the update.

2. The communication apparatus according to claim 1, wherein the computer program instructions further perform to:
write the second data into a free region of the memory.

3. A communication apparatus, comprising:
a processor; and
a storage medium having computer program instructions stored thereon, wherein the computer program instructions, when executed by the processor, perform to:
store first data indicating a function included in firmware before update, second data indicating the function included in firmware after the update, a table including first information, in which the first data is associated with an address where the first data is positioned, and second information, in which the second data is associated with an address where the second data is positioned, and a table value which identifies the first information and the second information;
execute processing based on the first data or the second data positioned at the address defined in the first information or the second information identified by the table value stored in the memory; and
rewrite the table value that is stored.

4. The communication apparatus according to claim 3, wherein the computer program instructions further perform to:
rewrite the address associated with the first data in the table to the address where the second data is positioned,
rewrite the address in accordance with an update timing defined in the firmware before the update.

5. An information processing method by a computer of a communication apparatus, the information processing method comprising:
storing first data indicating a function included in firmware before update, second data indicating the function included in firmware after the update, and a table in which the first data or the second data is associated with an address where the first data or the second data is positioned;
executing processing based on the first data or the second data positioned at the address defined in the table; and
rewriting the address associated with the first data in the table to the address where the second data is positioned, in accordance with update timing defined in the firmware before the update.

6. An information processing method by a computer of a communication apparatus, the information processing method comprising:
storing first data indicating a function included in firmware before update, second data indicating the function included in firmware after the update, a table including first information, in which the first data is associated with an address where the first data is positioned, and second information, in which the second data is associated with an address where the second data is positioned, and a table value which identifies the first information and the second information;
executing processing based on the first data or the second data positioned at the address defined in the first information or the second information identified by the table value; and
rewriting the table value that is stored.

7. The communication apparatus according to claim 1, wherein the computer program instructions further perform to:
rewrite the address associated with the first data in the table to the address where the second data is positioned, in accordance with the update timing determined based on processing status of a program of the firmware before the update in operation.

8. The communication apparatus according to claim 7, wherein the processing status indicates before or after an execution of a process based on the first data whose address is to be rewritten.

* * * * *